United States Patent [19]

Bergin

[11] 4,334,630
[45] Jun. 15, 1982

[54] HATCH COVER

[76] Inventor: Paul F. Bergin, 58471 Fir Rd., South, Mishawaka, Ind. 46544

[21] Appl. No.: 228,291

[22] Filed: Jan. 26, 1981

[51] Int. Cl.³ .................... B65D 41/06; B65D 41/36
[52] U.S. Cl. ............................... 220/300; 220/293; 220/3.8; 174/67; 339/36
[58] Field of Search ............... 220/3.8, 241, 242, 293, 220/300; 174/67; 339/36

[56] References Cited

U.S. PATENT DOCUMENTS

| | | | |
|---|---|---|---|
| 1,746,926 | 2/1930 | Boyle, Jr. | 220/300 |
| 3,369,691 | 2/1968 | Wei | 220/300 X |
| 3,805,788 | 4/1974 | Kleiner | 220/300 X |
| 3,966,073 | 6/1976 | Geisel | 220/3.8 X |

Primary Examiner—George T. Hall
Attorney, Agent, or Firm—Oltsch, Knoblock & Hall

[57] ABSTRACT

A hatch for attachment to a wall. The hatch includes a base and a cover and has interlocking pegs and grooves for securing the cover to the base.

3 Claims, 6 Drawing Figures

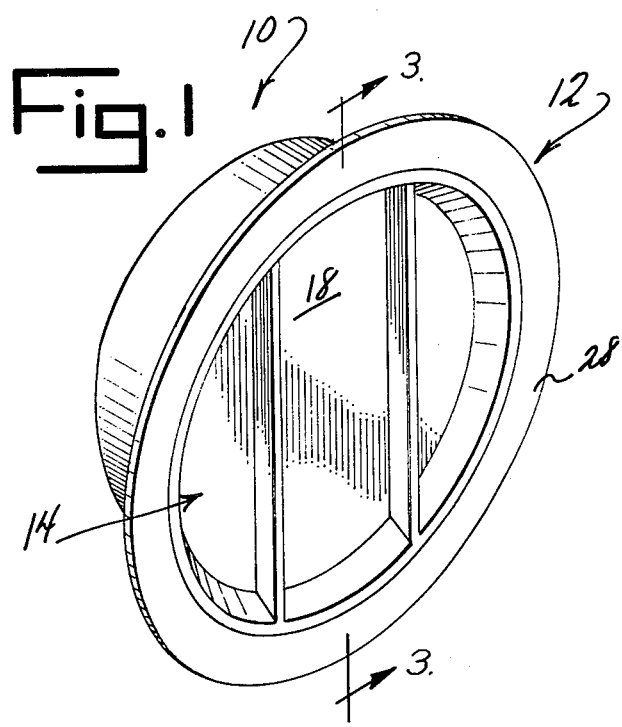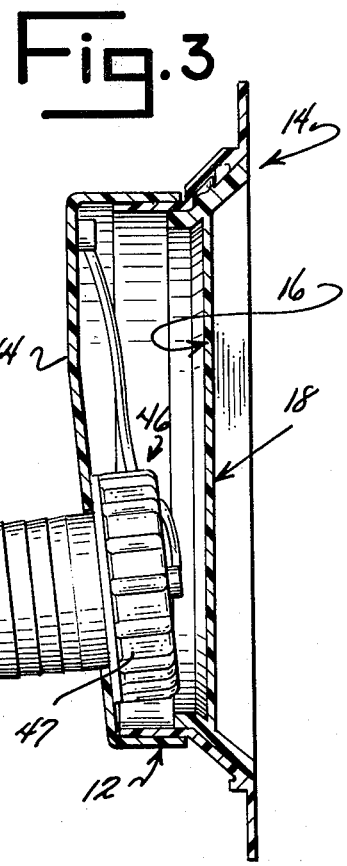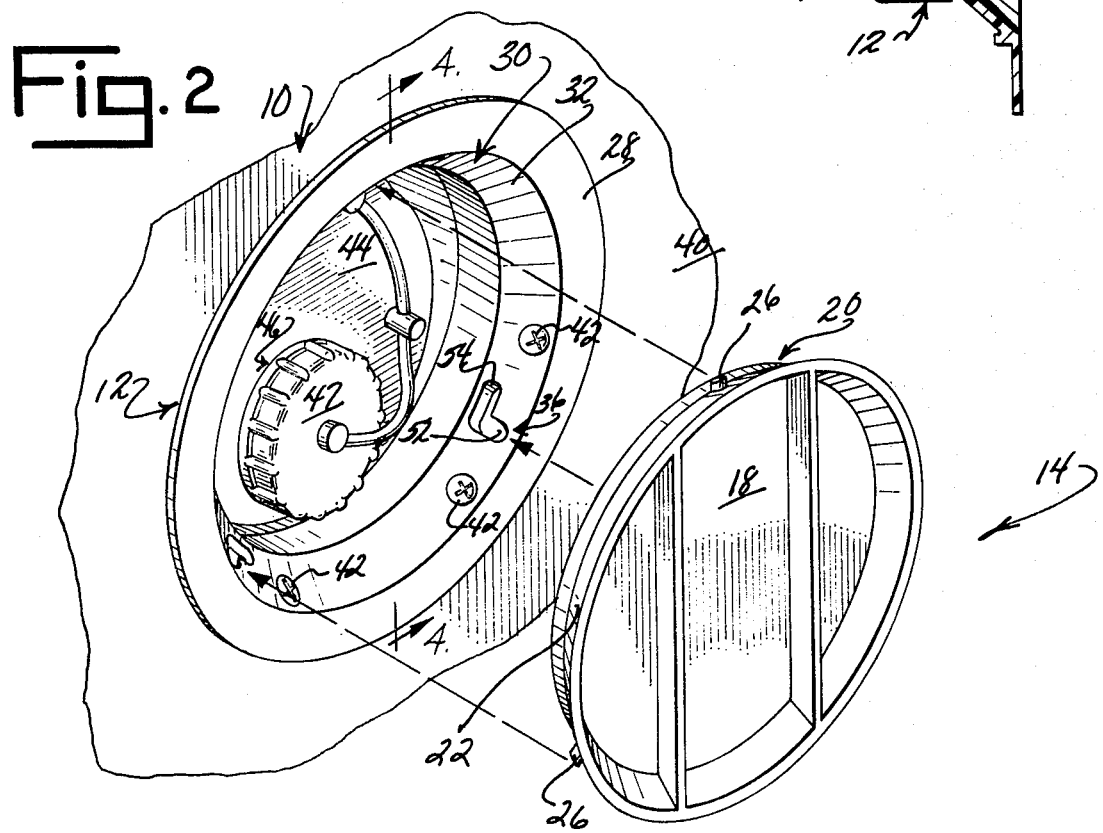

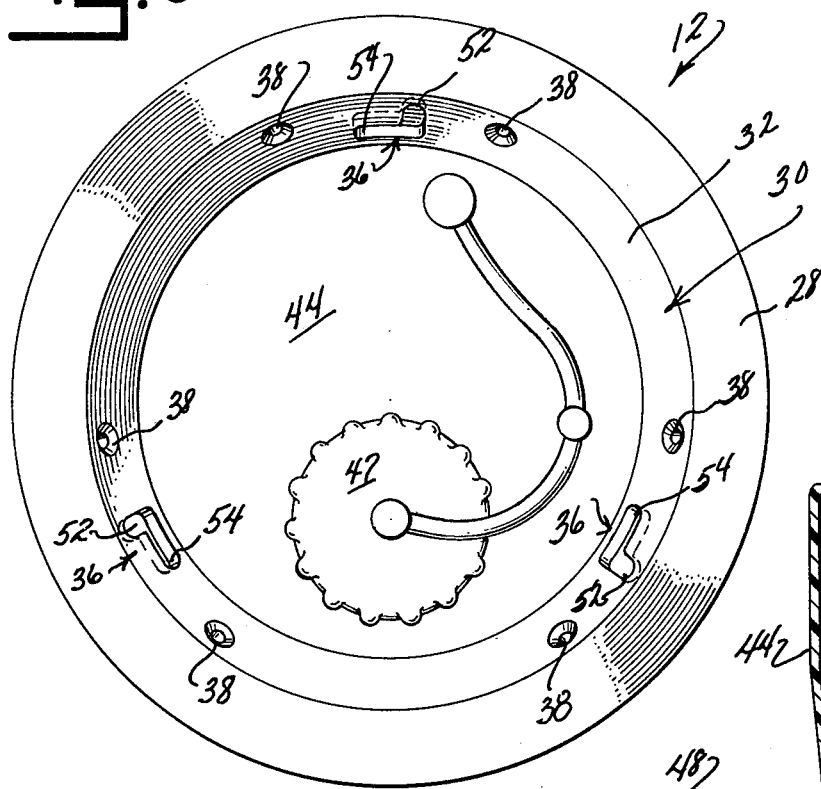
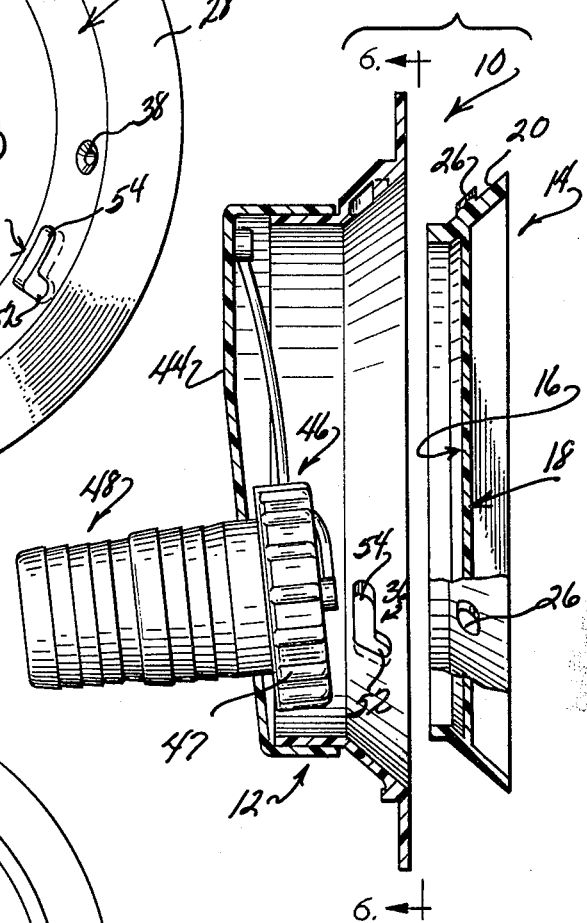
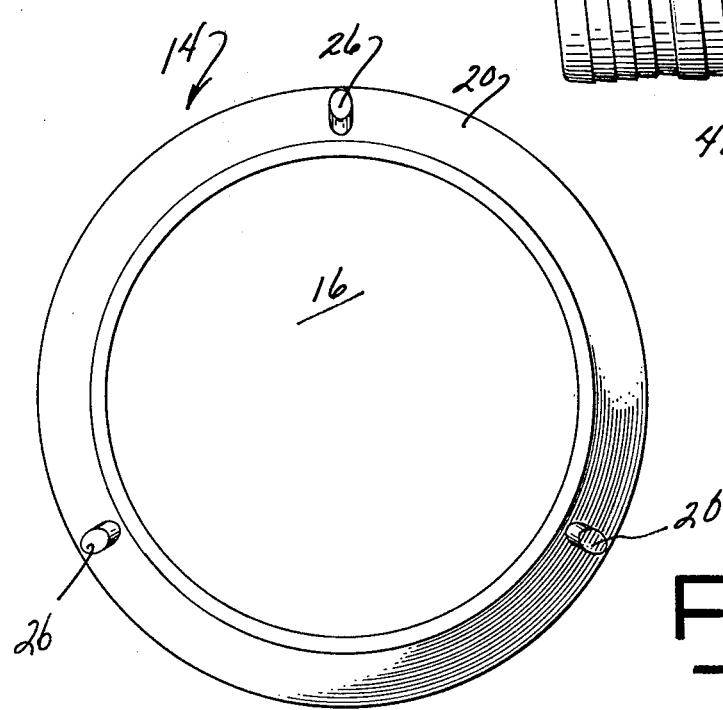

HATCH COVER

SUMMARY OF THE INVENTION

This invention relates to a hatch which will have application to wall located inlets and outlets, such as water inlets and electrical outlets for travel trailers, mobile homes and motor homes.

The hatch of this invention has a base adapted for attachment to a wall and a cover. The base can be secured to a wall and carries the inlet or outlet within it. The cover is removable and serves to provide protection for the inlet or outlet. The cover locks into position spanning the base with interlocking, cooperating pins and grooves.

Accordingly, it is an object of this invention to provide a means of protecting a wall located inlet or outlet.

Another object of this invention is to provide a hatch with a cover and base that interlock by means of pins and grooves.

Other objects will become apparent upon a reading of the following description.

BRIEF DESCRIPTION OF THE DRAWINGS

A preferred embodiment of this invention has been chosen wherein:

FIG. 1 is a perspective view of the hatch with its cover in place.

FIG. 2 is an exploded perspective view of the hatch attached to a wall with its cover removed.

FIG. 3 is a cross-sectional view of the hatch taken along line 3—3 of FIG. 1.

FIG. 4 is a cross sectional view of the hatch as taken along line 4—4 of FIG. 2.

FIG. 5 is a rear view of the hatch cover.

FIG. 6 is a front view of the hatch base plate.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Referring to the drawings, hatch 10 has a base plate 12 and cover 14. Cover 14 has inner face 16 outer face 18 and a flared forwarding extending lips 20. Pins 26 project from lips 20.

Base plate 12 has an end wall 44 and a side wall 30. Side wall 30 has a bevelled portion 32 which terminates in an outturned flange 28. The bevelled portion 32 of base plate side wall 30 is complimentarily angled to receive cover 14 as seen in FIGS. 1 and 3. Bevelled portion 32 has grooves 36 formed in it that are alignable with pins 26 on cover 14.

To utilize hatch 10, base plate 12 is secured to wall 40 with screws 42 which extend through holes 38 in base plate bevelled portion 32. End wall 44 of the base plate carries an end connector 46 having a removable cap 47. Spout 48 of connector 46 extends through wall 44 and is adjusted to connect to tubing. In other uses of hatch 10, base plate end wall 44 may be designed to accommodate other objects. As cover 14 fits into base plate 12, pins 26 of the cover enter base plate grooves 36. Pins 26 first enter into the entry ports 52 of the grooves. To secure cover 14 to base plate 12, the cover is rotated counter-clockwise relative to the plate to force pins 26 into lock ports 54 of the grooves. To gain access to connector 46, cover 14 is rotated clockwise to move pins 26 from groove lock ports 54 and the cover is lifted to expose connector 46.

It is understood that the invention is not to be limited to the preceding but may be modified within the scope of the appended claims.

What I claim is:

1. A hatch comprising a circular cover and a base plate, said cover including an inner face and an outer face, the perimeter of said cover being defined by a lateral surface, said base plate adapted for securement to a wall member and including a circumferential outer flange for mounting against said wall member, said base plate including a side wall defining in conjunction with said outer flange an opening into the base plate, said cover adapted to span said base plate opening, said cover lateral surface being juxtaposed with said base plate side wall when said cover spans said base plate opening, lock means for securing said cover to said base plate, said lock means including a plurality of co-operating interlocking pins and grooves, said pins carried by one of said base plate sidewall and said cover lateral surface, said grooves formed in the other of said base plate side wall and said cover lateral surface, said pins positioned to fit into and interlock with said grooves upon rotation of said cover relative to said base plate with the cover spanning said base plate opening.

2. The hatch of claim 1 wherein said base plate side wall includes a flared bevelled portion extending to said outer flange, said cover including a flared lip, said cover lip and base plate bevelled position being juxtaposed when said cover spans said base plate opening, said pins carried by one of said base plate bevelled portion and cover lip, said grooves formed in the other of said base plate bevelled portion and cover lip.

3. The hatch of claim 2 wherein said base plate has a plurality of securement holes formed in its bevelled portion, said holes for accepting screw means for attaching said base plate to a wall member.

* * * * *